United States Patent
Bianchessi et al.

(10) Patent No.: US 6,487,263 B1
(45) Date of Patent: Nov. 26, 2002

(54) DECODING OF A BIPHASE MODULATED BITSTREAM AND RELATIVE SELF-SYNCHRONIZING FREQUENCY DIVIDER WITH NONINTEGER RATIO

(75) Inventors: Marco Bianchessi, Sergnano (IT); Sandro Dalle Feste, Novara (IT); Nadia Serina, Castelcovati (IT); Marco Angelici, Galliate Lombardo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/203,704

(22) Filed: Dec. 2, 1998

(30) Foreign Application Priority Data

Dec. 4, 1997 (EP) .............................. 97830644

(51) Int. Cl.⁷ ................................. H04L 7/02
(52) U.S. Cl. ...................... 375/361; 375/360; 375/375
(58) Field of Search ................... 375/360, 361, 375/375, 362, 333, 282; 327/160, 151; 329/310; 341/70, 71

(56) References Cited

U.S. PATENT DOCUMENTS

| | | | |
|---|---|---|---|
| 4,185,273 A | | 1/1980 | Gowan |
| 4,661,965 A | * | 4/1987 | Maru ........................ 375/361 |
| 4,882,546 A | * | 11/1989 | Takamura et al. .......... 329/310 |
| 4,992,790 A | | 2/1991 | Montgomery |
| 5,459,765 A | | 10/1995 | Meyer et al. |
| 5,687,193 A | * | 11/1997 | Hassan ....................... 375/282 |
| 5,889,820 A | * | 3/1999 | Adams ....................... 375/282 |
| 5,901,188 A | * | 5/1999 | Roither ....................... 375/360 |
| 6,008,746 A | * | 12/1999 | White ......................... 341/70 |

FOREIGN PATENT DOCUMENTS

EP      0 425 302 A2    10/1990     ............ H03M/5/12

OTHER PUBLICATIONS

"Differential Manchester Decoder Requiring Low Speed System Clock," IBM Technical Disclosure Bulletin, vol. 31, No. 10, Mar. 1989, pp. 100–103.

* cited by examiner

Primary Examiner—Phuong Phu
(74) Attorney, Agent, or Firm—Lisa K. Jorgenson; Allen, Dyer, Doppelt, Milbrath & Gilchrist, P.A.

(57) ABSTRACT

A digital circuit generates a phase synchronization signal for a digital input signal coded according to a biphase modulation. The phase synchronization signal is derived from a clock signal having a higher frequency than the maximum switching frequency of the digital input signal. The frequency of the clock signal is divided with a fully digital divider circuit having a non-integer ratio. The divider is self-synchronizing with the input digital signal. Control signals are used to enable or disable switching of the frequency divider. These control signals are generated by two circuits which sample the input signal with the master clock signal and analyze triplets of consecutive sampling values.

22 Claims, 5 Drawing Sheets

| 0 | 3 | 4 | 7 | 8 | | 27 | 28 | 29 | 30 | 31 |
|---|---|---|---|---|---|---|---|---|---|---|
| PREAMBLE | | AUX. DATA | | LSB | AUDIO DATA MSB | | V | U | C | P |

DECODING OF A BIPHASE MODULATED BITSTREAM AND RELATIVE SELF-SYNCHRONIZING FREQUENCY DIVIDER WITH NONINTEGER RATIO

FIELD OF THE INVENTION

The present invention relates to the field of signal modulation, and more particularly, to an architecture and method for decoding a biphase modulated digital signal using a phase synchronization signal generated from the digital signal.

BACKGROUND OF THE INVENTION

In many applications, digitized signals or digital data are transmitted through a broadcasting medium on a carrier having frequencies or wavelengths digitally modulated. The digital coding is often based on a biphase modulation, which is also referred to as Manchester coding or Biphase Mark coding. With respect to such a modulation coding scheme, the occurrence of a transition within a given time slot corresponds to a logic "1" while the absence of any transition during the time slot corresponds to a logic "0". In each case, there will be a transition at the beginning and another transition at the end of the reference time slot. Therefore, the information content is tied to the presence or absence of transitions from a logic state to a different logic stage during the interval between the start transition. The information content is totally independent from the logic value of the signal, i.e., whether such a signal is high or low during a certain phase.

Figure 1:
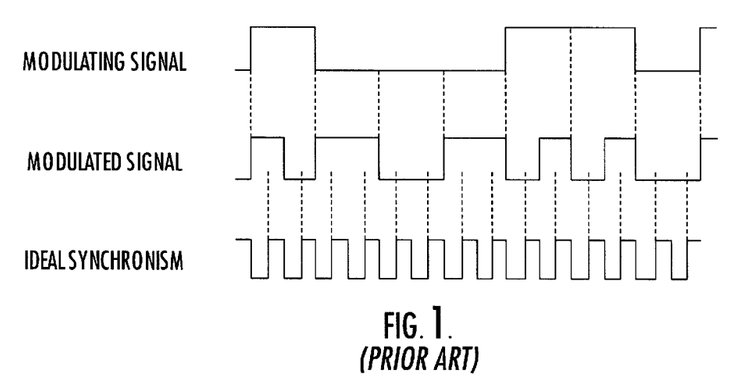
FIG. 1 illustrates a coding based on a biphase modulation, according to the prior art.

The received digital stream to be demodulated is then decoded using a synchronizing signal (clock) generated to maintain a perfect phase synchronization with the stream of received digital data. Coding based on a Manchester biphase modulation and the relative signal of an ideal decoding clock are illustrated in FIG. 1. Coding based on the biphase Manchester modulation is used in many applications according to established and standardized protocols. A typical example of an application is with respect to the broadcast of audio signals coded according to the AES-EBU standard. This standard has been enhanced and redefined within different standardization bodies, e.g., SP-DIF, IEC958 and EIAJ. However, the biphase coding has remained unchanged.

In many systems, digital data are organized in a discontinuous manner that is exchanged in bursts. Typical applications include those in which the data is structured according to a TDMA (Time Division Multiple Access) protocol. In a TDMA application, continuity of phase synchronization between successive bursts is not guaranteed. Among these systems, wideband access systems of the passive optical network (PON) type are also included.

Figure 2:
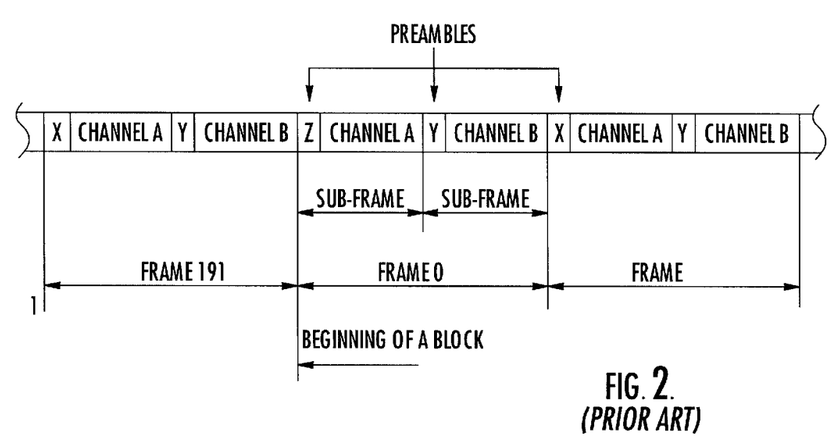
FIG. 2 illustrates an arrangement in frames and subframes of stereo audio information broadcasted serially, according to the prior art.

For example, when broadcasting digitized audio signals, two samples of the audio signal are transmitted at a prefixed sampling frequency. These two samples relate respectively to the right channel and to the left channel. Each of these samples is associated with a subframe. The subframes of channel A and of channel B are transmitted serially and alternately. Each subframe is preceded by an acknowledgment preamble, as illustrated in FIG. 2.

By way of illustration, an example is taken into consideration. This is done without intending to limit the application of the system of the invention. The ensuing description shall refer to an AES-EBU broadcasting protocol of digitized audio signals for pointing out the significant aspects of the invention. With reference to the scheme of FIG. 2, the pair of subframes A and B corresponding to the same sampling instant forms a frame. A whole set of 192 consecutive frames forms a block.

Figure 3:
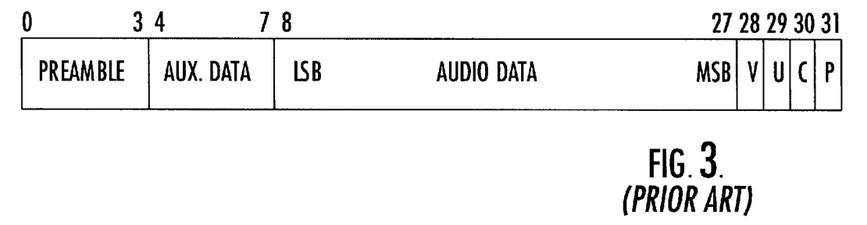
FIG. 3 shows the structure of a subframe of FIG. 2.

A subframe contains data relative to the audio sample, and a series of additional information. A subframe structure is represented in FIG. 3. Out of the 32 bits, the first four bits form the preamble. The following four bits transfer auxiliary data. The audio sample is represented by the following twenty bits. The last four bits contain control information, i.e., the validity bit (V), the user bit (U), the state of the channel bit (C) and the parity bit (P), respectively.

Figure 4:
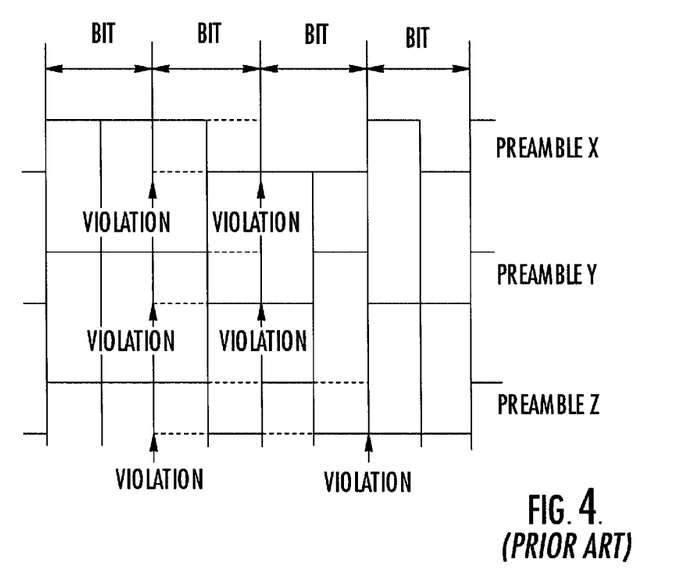
FIG. 4 illustrates the function of the preamble portions of each subframe during the decoding phase, according to the prior art.

There are three different preambles that respectively identify the beginning of the subframe relative to channel A (X preamble), the beginning of the subframe relative to channel B (Y preamble), and the beginning of a new block signaled by the substitution of the X preamble with the Z preamble. FIG. 4 shows the relative waveforms of the three preambles. In addition to the three preamble sequences shown in the figure, the corresponding inverted versions are also valid since the modulation code does not depend on the signal polarity.

For the correct reception and interpretation of the digital stream, it is necessary to have a synchronizing signal that permits the signal to be sampled correctly and to apply the samples to a decoding logic. This phase synchronization signal must have an edge for each possible transition change of the broadcasted signal. Furthermore, the edge of the synchronization signal should fall as close as possible to the middle of the interval between any two possible transition variations to ensure maximum immunity to noise and jitter.

Normally, this phase synchronization signal (clock) is generated by a PLL circuit locked to the switching frequency of the broadcasted signal with a carefully controlled phase. Once the signal is sampled, the decoding logic may be designed as a state machine using the synchronization signal itself as a clock. In this, as well as in other similar applications, the synchronization signal is commonly produced by an analog PLL circuit. The analog PLL circuit extracts from the received signal its clock content using a passband filter, and a VCO is locked to the switching frequency of the received signal to generate a stable clock.

The obtained clock signal is generally used, apart for decoding the data, to drive a D/A converter downstream from the receiver. Therefore, the obtained clock signal must be very stable in terms of jitter to prevent degradation in the performances of the converter. If this function is not required, such as when a DSP is to receive the data, a completely digital approach is preferred to provide reduced integration complexity. A digital approach does not require analog components such as a VCO, filters and frequency comparators.

Furthermore, even in an analog receiver, there exist operating conditions in which the signal is not perfectly locked, i.e., at start up or during switching among different signal sources. In these cases, the receiver would sample the signal at wrong instants causing decoding errors. Normally, a receiver signals these conditions through a validity bit. However, it would be preferable to have an intrinsically more robust receiver capable of correctly interpreting the signal even under a condition of an unlocked clock.

SUMMARY OF THE INVENTION

This invention relates primarily to an improved decoding method for an input digital signal or digital stream that is coded according to a biphase modulation. Decoding is performed by sampling the input digital signal with a sampling signal in phase synchronization with the input digital signal. The phase synchronization signal is derived from a clock signal (master clock) having a higher frequency than the maximum switching frequency of the digital input signal. The frequency of the clock signal is divided by a fully digital divider circuit having an irrational or non-integer ratio. The digital divider circuit is self-synchronizing with the input digital signal.

Preferably, the master clock signal should have a frequency in the vicinity of an integer multiple of the maximum frequency of the input signal, i.e., nominally a multiple of the maximum frequency of the input signal. According to one approach, the master clock signal is divided by a certain integer number determined by the use of a divider, while enabling or disabling its switching through control signals. The control signals are generated by two circuits which sample the input signal with the master (high frequency) clock signal and analyze triplets of consecutive sampling values. The first circuit generates a first control signal upon detecting the triplet 001 or 110. The second circuit generates a second control signal upon detecting the triplet 011 or 100.

Preferably, enabling or disabling of the divider by the first circuit takes place on the rising edge of the master clock, and by the second circuit on a falling edge of the master clock. Another aspect of the invention is to provide an architecture of a fully digital frequency divider of an irrational or noninteger ratio that is self-synchronizing with an input digital signal coded according to a biphase modulation. The fully digital frequency divider is capable of generating a sampling signal of the input stream with the characteristics illustrated above. The frequency divider uses a master clock of a sufficiently high frequency, typically a multiple thereof (at least nominally) having a value in the vicinity of a multiple integer of the switching frequency of the input stream, though not necessarily synchronized with it.

DETAILED DESCRIPTION OF THE PREFERRED EMBODIMENTS

Figure 5:
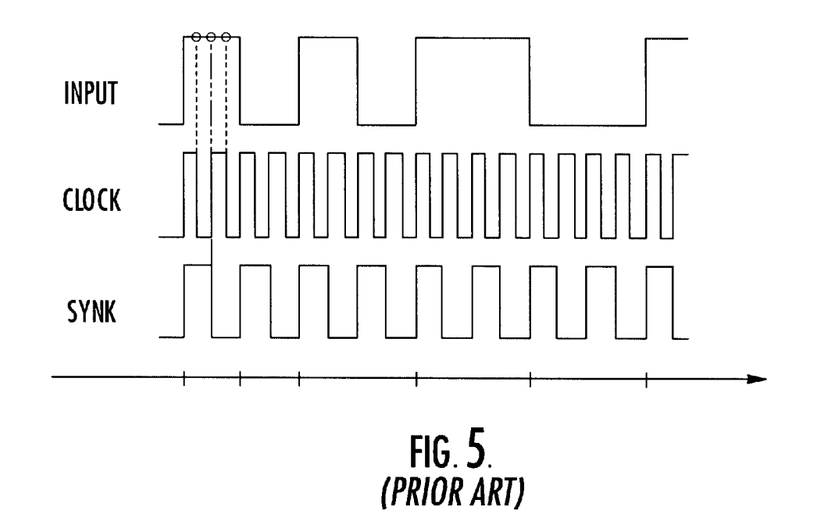
FIG. 5 shows a case in which the sampling signal derived by digital division of a master clock is in perfect phase synchronization with the input digital stream to be decoded, according to the prior art.

To describe functioning of the architecture of the present invention, it is useful to start from the ideal case of a perfectly synchronized clock signal. Thereafter, what may occur when the clock signal looses perfect synchronization will be described. Referring to FIG. 5, the master clock signal Ck has a frequency equal to four times the maximum frequency of the input signal for example. The required phase synchronization signal Synk is obtained through a simple division by two of the master clock signal Ck.

An observed characteristic for the case of a biphase modulated digital input stream is produced by sampling the input signal with the falling edges of the master clock signal Ck. Triplets of samples that always have the same logic value are produced. According to the present invention, this result is used to detect the condition of phase synchronization of the decoding and demodulating system. When the sampling signal is not synchronized, this result is not provided and triplets of samples of different values are produced.

Figure 6:
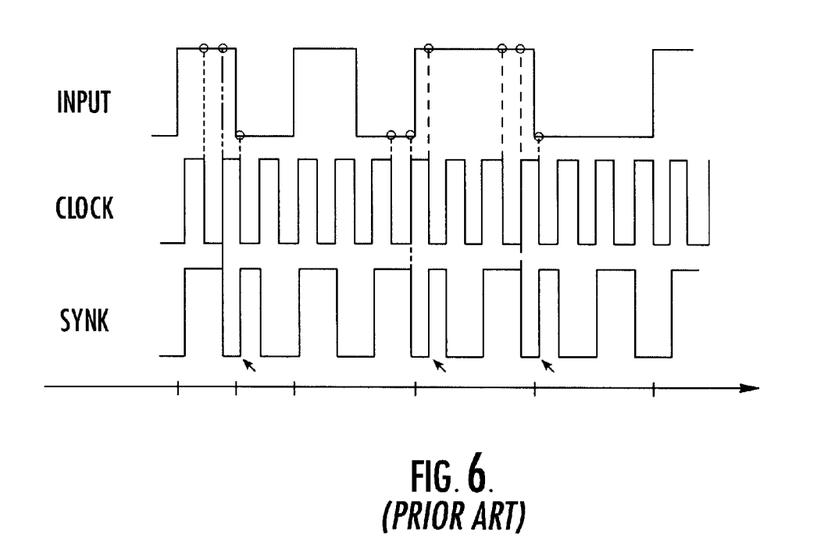
FIGS. 6 and 7 respectfully show cases in which the sampling signal is too slow and too fast with respect to an ideal situation of a perfect phase synchronization, according to the prior art.
Figure 7:
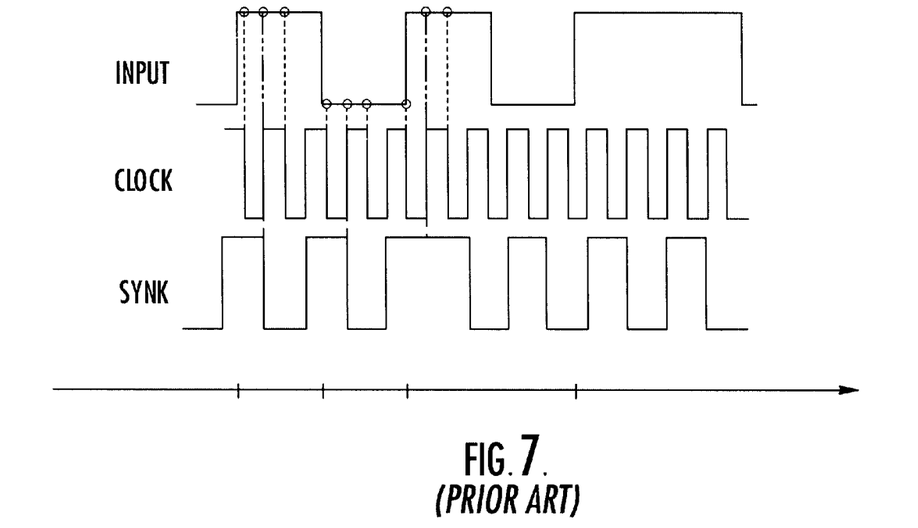

The following figures show two possible cases in which the sampling signal has a frequency higher and lower than its ideal phase-lock value. Referring to FIG. 6, when the clock is slow (frequency too low), the triplets sometimes have their first two samples equal while the third sample is different. An opposite case is shown in FIG. 7, when the clock is fast (frequency too high), the first sample of the triplets is different while the following two samples are equal.

This characteristic may be used to discriminate the two cases and to intervene in the division of the master clock signal Ck to correct the generated synchronization signal Synk. This intervening is performed in such a way to maintain its coherency with the phase of the input digital signal Input. The system of the invention carries out the correction in a substantially instantaneous manner preventing any wrong transition, which would generate decoding errors.

Starting from the principle of operation described above, it is possible to form different circuits that implement a frequency divider with the desired characteristics. Among the possible alternatives, there is one which is particularly simple to illustrate. However, there are other alternatives that are more efficient in terms of minimizing the area of integration and maximizing speed. The objective is to demonstrate the feasibility of a device that will function according to the above illustrated principles of the invention.

The invention is not limited to the particular embodiment described herein. A person skilled in the art readily recognizes that the same functions may be implemented with different circuit architectures. For example, an alternative embodiment of a circuit architecture according to the present invention is defined using a program of automatic circuit synthesis that offers advantages in terms of optimization of required area of integration and speed.

Figure 8:
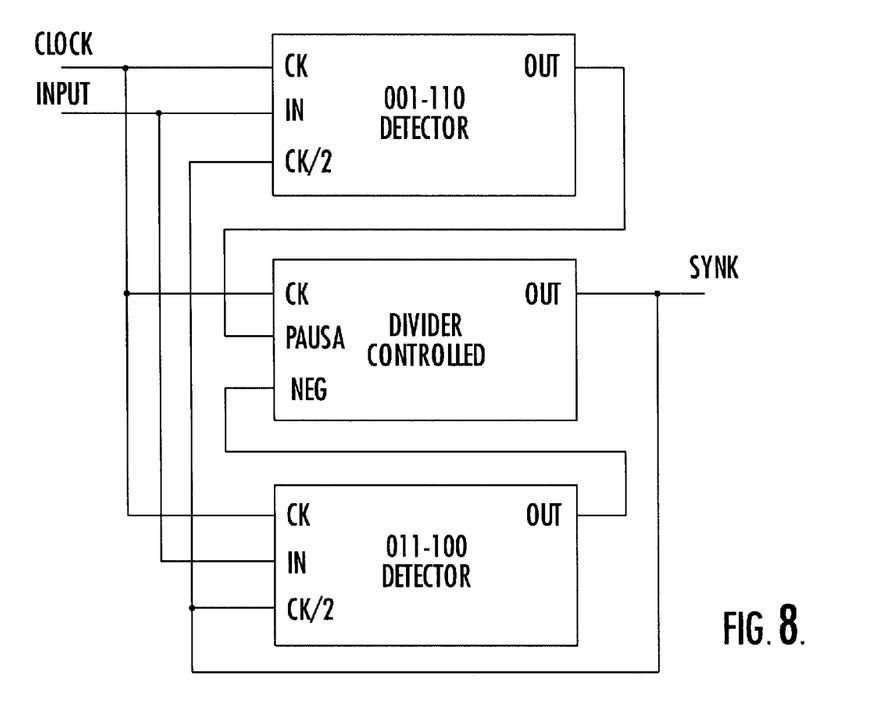
FIG. 8 is a functional diagram of a self-synchronizing frequency divider with a non-integer ratio, according to the present invention.

As illustrated in the diagram scheme of FIG. 8, the circuit comprises three fundamental blocks: a controlled divider, a detection circuit for detecting the sequences 001 or 110 (clock too slow), and a detection circuit for detecting the sequences 011 or 100 (clock too fast). The controlled divider comprises a normal frequency divider circuit, e.g., dividing by two. The frequency divider is formed with a JK flip-flop, where the J and K inputs are conditioned to a logic "high" state. The inputs are used for disabling the switching of the frequency divider by setting the J and K inputs to a low state when the control signal Pause is active. The inputs also allow for instantaneous switching of the frequency divider when the control signal Neg presents a rising edge.

Figure 9:
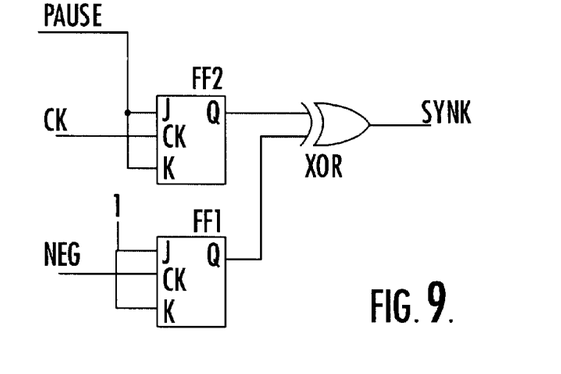
FIG. 9 shows an embodiment of the controlled divider of FIG. 8.

Another embodiment of the frequency divider circuit is shown in FIG. 9. With respect to the two triplet detection circuits, it is necessary that these circuits not only detect the sequences, but also activate the two control signals Pause and Neg at the correct instant to cause a proper correction. The detection circuit for the sequences 001 or 110 may be formed, for example, according to the diagram of FIG. 10.

Figure 10:
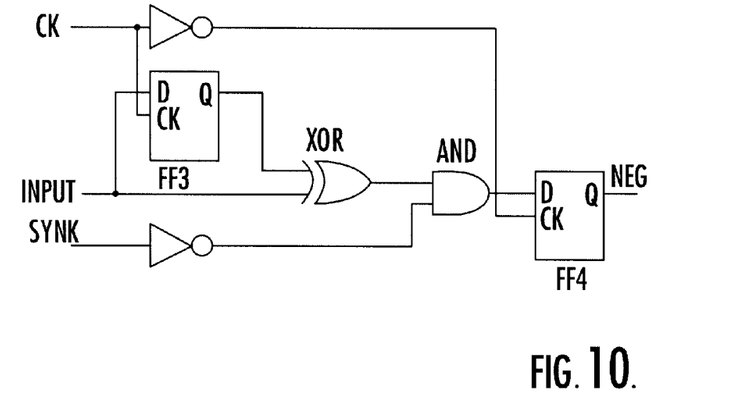
FIG. 10 shows an embodiment of a detection block that detects the triplets 001,110 of the controlled divider of FIG. 8.

The detection circuit of FIG. 10 verifies the identity of the second and third bit of a sequence of three bits by using an XOR gate. The circuit samples the input signal on the rising edge of the master clock signal Ck and compares it through the XOR gate with the signal on the falling edge of the clock Ck. When the result of the comparison is not equal, the output will be a "1", thus signaling a detection. The sequence is defined on the falling edge of the signal output by the divider (in the vicinity of Ck/2), herein defined as the phase synchronization signal Synk. Therefore, the detection is operative only when Synk is low. For this reason, an AND gate is used to enable the signaling when Synk is a "0".

Figure 11:
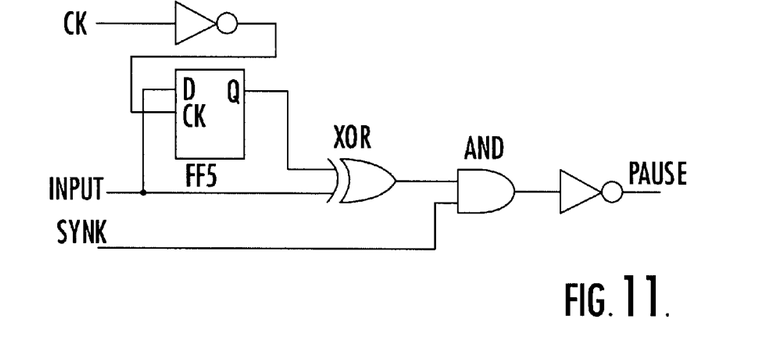
FIG. 11 shows an embodiment of a detection block that detects the triplets 001,100 of the controlled divider of FIG. 8.

The detection circuit for the sequences 011 and 100 may be formed, for example, according to the diagram of FIG. 11. This circuit samples the input signal on the falling edge of the master clock signal Ck. If the sampled value has changed upon the arrival of a rising edge of the clock, the output Pause is a "0". Accordingly, the controlled divider, i.e., the flip-flop FF2 of the diagram of FIG. 8, does not switch. Even in this case, it is necessary to enable the detection circuit on the falling edge of the signal output by the master clock signal (in the vicinity of Ck/2), i.e., of the phase synchronization signal Synk. However, in this case, the bits to detect are the two that precede the edge. Therefore, this circuit is enabled when the Synk signal is high.

The divisor may be any integer number or a multiple of two. This is sufficient for the generation of appropriate control signals for enabling/disabling switching of the frequency divider to modify the ratio around the pre-established integer value. This is done in accordance with the above exemplified principle of the invention.

What is claimed is:

1. A digital circuit for generating a signal in phase synchronization with a biphase modulated digital input signal, the digital circuit comprising:
   a controlled frequency divider for outputting a phase synchronized signal based upon a master clock signal having a frequency higher than a maximum frequency of the biphase modulated digital input signal;
   a first detection circuit for generating a first control signal responsive to detection of a triplet sequence comprising 001 or 110 of sampled values of the biphase modulated digital input signal with the master clock signal; and
   a second detection circuit for generating a second control signal responsive to detection of a triplet sequence comprising 011 or 100 of the sampled values of the biphase modulated digital input signal with the master clock signal;
   the first and second control signals enabling or disabling switching of an output of said controlled frequency divider.

2. A digital circuit according to claim 1, wherein said controlled frequency divider comprises:
   a pair of JK flip-flops comprising
      a first flip-flop having J and K inputs biased to enable switching, and a clock input for receiving the first control signal, and
      a second flip-flop having J and K inputs for receiving the second control signal, and a clock input for receiving the master clock signal; and an XOR gate having two inputs coupled to respective Q outputs of said pair of JK flip-flops.

3. A digital circuit according to claim 1, wherein said first detection circuit comprises:
   a first D flip-flop having a D input for receiving the biphase modulated digital input signal, and a clock input for receiving the master clock signal;
   an XOR logic gate having a first input connected to a Q output of said first D flip-flop, and a second input for receiving the biphase modulated digital input signal;
   an AND gate having a first input connected to an output of said XOR logic gate, and a second input for receiving an inverted phase synchronization signal; and
   a second D flip-flop having a clock input for receiving an inverted master clock signal, and a D input connected to an output of said AND gate, and a Q output for providing the first control signal.

4. A digital circuit according to claim 1, wherein said second detection circuit comprises:
   a D flip-flop having a clock input for receiving the master clock signal, and a D input for receiving the biphase modulated digital input signal;
   an XOR gate having a first input connected to a Q output of said D flip flop, and a second input for receiving the biphase modulated digital input signal;
   an AND gate having a first input connected to an output of said XOR gate, and a second input for receiving the phase synchronization signal; and
   an inverter connected to an output of said AND gate for inverting a received signal, and an output for providing the second control signal.

5. A digital circuit according to claim 1, wherein the biphase modulated digital input signal is in accordance with an AES-EBU standard.

6. A circuit for generating a signal in phase synchronization with a biphase modulated digital input signal, the circuit comprising:
   a first detection circuit comprising
      a clock input for receiving a master clock signal having a frequency higher than a maximum frequency of the biphase modulated digital input signal, and
      an input for receiving the biphase modulated digital input signal, said first detection circuit generating a first control signal responsive to detection of at least one first predetermined sampled value of the biphase modulated digital input signal with the master clock signal; a second detection circuit comprising
      a clock input for receiving the master clock signal, and
      an input for receiving the biphase modulated digital input signal, said second detection circuit generating a second control signal responsive to detection of at least one second predetermined sampled value of the biphase modulated digital input signal with the master clock signal; and a controlled frequency divider comprising
      an output for providing the phase synchronized signal based upon the master clock signal,
      a clock input for receiving the master clock signal,
      a first input for receiving the first control signal for enabling or disabling switching of the output, and
      a second input for receiving the second control signal for enabling or disabling switching of the output.

7. A circuit according to claim 6, wherein the at least one first predetermined sampled value comprises a triplet sequence comprising 001 or 110.

8. A circuit according to claim 6, wherein the at least one second predetermined sampled value comprises a triplet sequence comprising 011 or 100.

9. A circuit according to claim 6, wherein said controlled frequency divider comprises:
   a pair of JK flip-flops comprising
      a first flip-flop having J and K inputs biased to enable switching, and a clock input for receiving the first control signal, and
      a second flip-flop having J and K inputs for receiving the second control signal, and a clock input for receiving the master clock signal; and an XOR gate having two inputs respectively coupled to respective Q outputs of said pair of JK flip-flops.

10. A circuit according to claim 6, wherein said first detection circuit comprises:
   a first D flip-flop having a D input for receiving the biphase modulated digital input signal, and a clock input for receiving the master clock signal;
   an XOR logic gate having a first input connected to a Q output of said first D flip-flop, and a second input for receiving the biphase modulated digital input signal;
   an AND gate having a first input connected to an output of said XOR logic gate, and a second input for receiving an inverted phase synchronization signal; and
   a second D flip-flop having a clock input for receiving an inverted master clock signal, and a D input connected to an output of said AND gate, and a Q output for providing the first control signal.

11. A circuit according to claim 6, wherein said second detection circuit comprises:
   a D flip-flop having a clock input for receiving the master clock signal, and a D input for receiving the biphase modulated digital input signal;
   an XOR gate having a first input connected to a Q output of said D flip flop, and a second input for receiving the biphase modulated digital input signal;
   an AND gate having a first input connected to an output of said XOR gate, and a second input for receiving the phase synchronization signal; and
   an inverter connected to an output of said AND gate for inverting a received signal, and an output for providing the second control signal.

12. A circuit according to claim 6, wherein the biphase modulated digital input signal is in accordance with an AES-EBU standard.

13. A method of decoding a biphase modulated digital input signal, the method comprising:
   dividing a frequency of a master clock signal according to a non-integer ratio using a frequency divider circuit having a predetermined integer number, the dividing comprising
      sampling the biphase modulated digital input signal with the master clock signal using a first detection circuit, and analyzing at least one sampled value,
      sampling the biphase modulated digital input signal with the master clock signal using a second detection circuit, and analyzing at the least one sampled value,
      generating a first control signal based upon detection by the first detection circuit of at least one first predetermined sampled value,
      generating a second control signal based upon detection by the second detection circuit of at least one second predetermined sampled value, and
      enabling or disabling switching of the frequency divider circuit responsive to the first and second control signals;
   generating a sampling signal that is self-synchronized with the biphase modulated digital input signal, and being derived from the master clock signal having a frequency multiple of a maximum frequency of the biphase modulated digital input signal; and
   sampling the biphase modulated digital input signal with the sampling signal that is in phase synchronization with the biphase modulated digital input signal.

14. A method according to claim 13, wherein the at least one first predetermined sampled value comprises a triplet sequence comprising 001 or 110.

15. A method according to claim 13, wherein the at least one second predetermined sampled value comprises a triplet sequence comprising 011 or 100.

16. A method according to claim 13, wherein the enabling or disabling occurs on a rising edge of the master clock signal for the first detection circuit and on a falling edge of the master clock signal for the second detection circuit.

17. A method according to claim 13, wherein the biphase modulated digital input signal is in accordance with an AES-EBU standard.

18. A digital circuit for decoding a biphase modulated digital input signal, the digital circuit comprising:
   a frequency divider circuit for generating a sampling signal that is self-synchronized with the biphase modulated digital input signal, the sampling signal being derived by division by a non-integer of a master clock signal, the master clock signal having a frequency multiple of a maximum frequency of the biphase modulated digital input signal;
   a first detection circuit for sampling the biphase modulated digital input signal with the master clock signal, analyzing at least one sampled value, and generating a first control signal based upon detection by said first detection circuit of at least one first predetermined sampled value;
   a second detection circuit for sampling the biphase modulated digital input signal with the master clock signal, analyzing the at least one sampled value, and generating a second control signal based upon detection by said second detection circuit of at least one second predetermined sampled value;
   switching of said frequency divider circuit being enabled or disabled based upon the first and second control signals; and
   a sampling circuit for sampling the biphase modulated digital input signal with the sampling signal that is in phase synchronization with the biphase modulated digital input signal.

19. A digital circuit according to claim 18, wherein the at least one first predetermined sampled value comprises a triplet sequence comprising 001 or 110.

20. A digital circuit according to claim 18, wherein the at least one second predetermined sampled value comprises a triplet sequence comprising 011 or 100.

21. A digital circuit according to claim 18, wherein enabling or disabling switching of said frequency divider circuit occurs on a rising edge of the master clock signal for said first detection circuit and on a falling edge of the master clock signal for said second detection circuit.

22. A digital circuit according to claim 18, wherein the biphase modulated digital input signal is in accordance with an AES-EBU standard.

* * * * *

UNITED STATES PATENT AND TRADEMARK OFFICE
CERTIFICATE OF CORRECTION

PATENT NO.    : 6,487,263 B1
DATED         : November 26, 2002
INVENTOR(S)   : Bianchessi et al.

It is certified that error appears in the above-identified patent and that said Letters Patent is hereby corrected as shown below:

<u>Column 6,</u>
Line 49, delete "a second detection circuit comprising"
Line 50, insert -- a second detection circuit comprising --

Signed and Sealed this

Thirteenth Day of May, 2003

JAMES E. ROGAN
*Director of the United States Patent and Trademark Office*